United States Patent [19]

Krueger

[11] Patent Number: 4,457,340

[45] Date of Patent: Jul. 3, 1984

[54] POWER-ASSISTED VALVE, PARTICULARLY FOR SYSTEMS HANDLING VISCOUS MATERIALS

[76] Inventor: Wallace F. Krueger, 4401 Merriweather Rd., Toledo, Ohio 43623

[21] Appl. No.: 365,339

[22] Filed: Apr. 5, 1982

Related U.S. Application Data

[62] Division of Ser. No. 103,382, Dec. 13, 1979, Pat. No. 4,339,233.

[51] Int. Cl.³ .................... F16K 31/122; F16K 15/04
[52] U.S. Cl. ........................... 137/625.5; 137/533.11; 137/DIG. 2; 251/63.4
[58] Field of Search .................... 137/DIG. 2, 533.11, 137/625.5; 251/63.4, 82

[56] References Cited

U.S. PATENT DOCUMENTS 1,435,396 11/1922 Howland ..................... 137/DIG. 2
1,831,404 11/1931 Ayers .................................. 251/63.4

Primary Examiner—Arnold Rosenthal
Attorney, Agent, or Firm—Allen D. Gutchess, Jr.

[57] ABSTRACT

A power-assisted valve is provided which is particularly effective for systems handling viscous materials, such as certain metering systems. The check valve operates effectively even with highly-filled viscous resins used in such systems. The valve includes a valve seat and a valve ball which can be urged toward the valve seat to a closed position by a fluid-powered cylinder and piston. The piston rod is separate from the valve ball so that the ball can rotate relative to the valve seat.

4 Claims, 3 Drawing Figures

POWER-ASSISTED VALVE, PARTICULARLY FOR SYSTEMS HANDLING VISCOUS MATERIALS

This is a division of application Ser. No. 103,382, filed Dec. 13, 1979, now U.S. Pat. No. 4,339,233.

This invention relates to a valve and particularly to a power-assisted valve for use in systems handling highly viscous materials.

Existing valves used in systems handling highly-filled, viscous materials, such as resins in metering systems, have a number of problems. The valves commonly contain pockets where no-flow conditions exist, being dead areas which are not flushed by the flow of the material through the valves. These pockets usually produce orifice types of passages through the valves that result in turbulent flow with eddy currents in the central portion of the flowing medium. This type of flow exists only when the piping system is clean and gradually diminishes as the pockets fill with filler or more viscous materials that are induced to separate from the overall material during the initial action of the central turbulent flow, in combination with no-flow conditions in the dead areas. The degree to which this action occurs is dependent upon the rheology of the system and the velocity of the flowing material. In any event, eventually the pockets fill with a concentration of the filler or more highly viscous portions of the material that should have stayed in suspension. AS the pockets fill, the resulting hard deposits can interfere with the rotation or other movement of the valves' internal parts and prevent full opening and closing of the valves. Bleed or bypass conditions during cycling of the system can thus occur. Total lock-up or freezing of the valves, whether in open or closed positions, can also occur, particularly when the valves have not been operated for a period of time.

Similar problems also exist with valves used as pressure differential means, such as pressure relief valves, back-pressure valves and spring-adjustable sequencing valves. The deposits cause such valves to gradually malfunction until total loss of operation is encountered.

Plug and ball style shut-off valves retain a portion of the flowing material within a port or passage when in the off position. When off for any length of time, with the material lying dormant, the more viscous portions can settle out and become hardened. When the valve is again moved to the open position, this hard plug can prevent rotation or motion or can shear or damage any elastomeric seals which may be used in the valve. If the valve can be moved to the open position, the hard deposit can block or at least slow the flow therethrough.

Butterfly valves commonly have elastomeric or other soft seals mated against a metal face. The build up of hard deposits at the seals can result in very high forces being required to open the valves, particularly due to the large sealing area. If movement of the butterfly valve is achieved, the seal will frequently be torn and/or damaged. The abrasive and/or chemical action of the higher viscous materials interfere with the operation of and can shorten the life of any valve employing soft sealing faces. This is also true of most valves which operate with a sliding shear action, particularly when fillers, fibers, or particulates are trapped between the seals and metal interfaces.

In accordance with the present invention, a power-assisted ball valve is provided. The valve includes means forming a steel valve seat with a retaining chamber on one side. A hard steel or carbide ball is located in the chamber and is designed to achieve a fully closed position when bearing against the valve seat. When the valve is in an open position and the ball is spaced from the valve seat, it can rotate and shift out of the sealing position. This provides a virtually unlimited seal life by preventing constantly repetitive point contact between the ball and the seat. The ball is urged toward the closed position by fluid-operated means. This can be in the form of a cylinder having a piston reciprocable therein with a piston rod connected to the piston and extending out of the cylinder toward the valve ball. The piston rod and valve ball are separate to enable independent movement of the valve ball. The valve seat itself can be extremely sharp to reduce the area between the seat and valve where fillers, fibers, or particulates can lodge. When they do lodge there, a sharp shearing action of the force of the ball against the seat readily cuts the material. Any residue left up on the ball also will be cut and removed by the seat and high closure pressures as the ball constantly is repositioned.

The ball can also move from the closed position to a fully open position with a relatively small movement of the ball from the seat. This enables a rapid cycle action to be achieved, when needed, and minimum bleed back or slip of the viscous medium at the seat will occur. The valve is also of simple design and provides smooth, free flow or constant flush of all surfaces without stagnant or dead areas.

The valve in accordance with the invention can also be modified as a three-way valve. In such instance, a second fluid-operated means can be employed. One moves the valve ball against one valve seat and the other moves the valve ball against the other valve seat, with the valve ball still retaining the free floating movement.

It is, therefore, a principal object of the invention to provide an improved valve, particularly for viscous material, having the advantages and features discussed above.

Many other objects and advantages of the invention will be apparent from the following detailed description of preferred embodiments thereof, reference being made to the accompanying drawings, in which.

Figure 1:
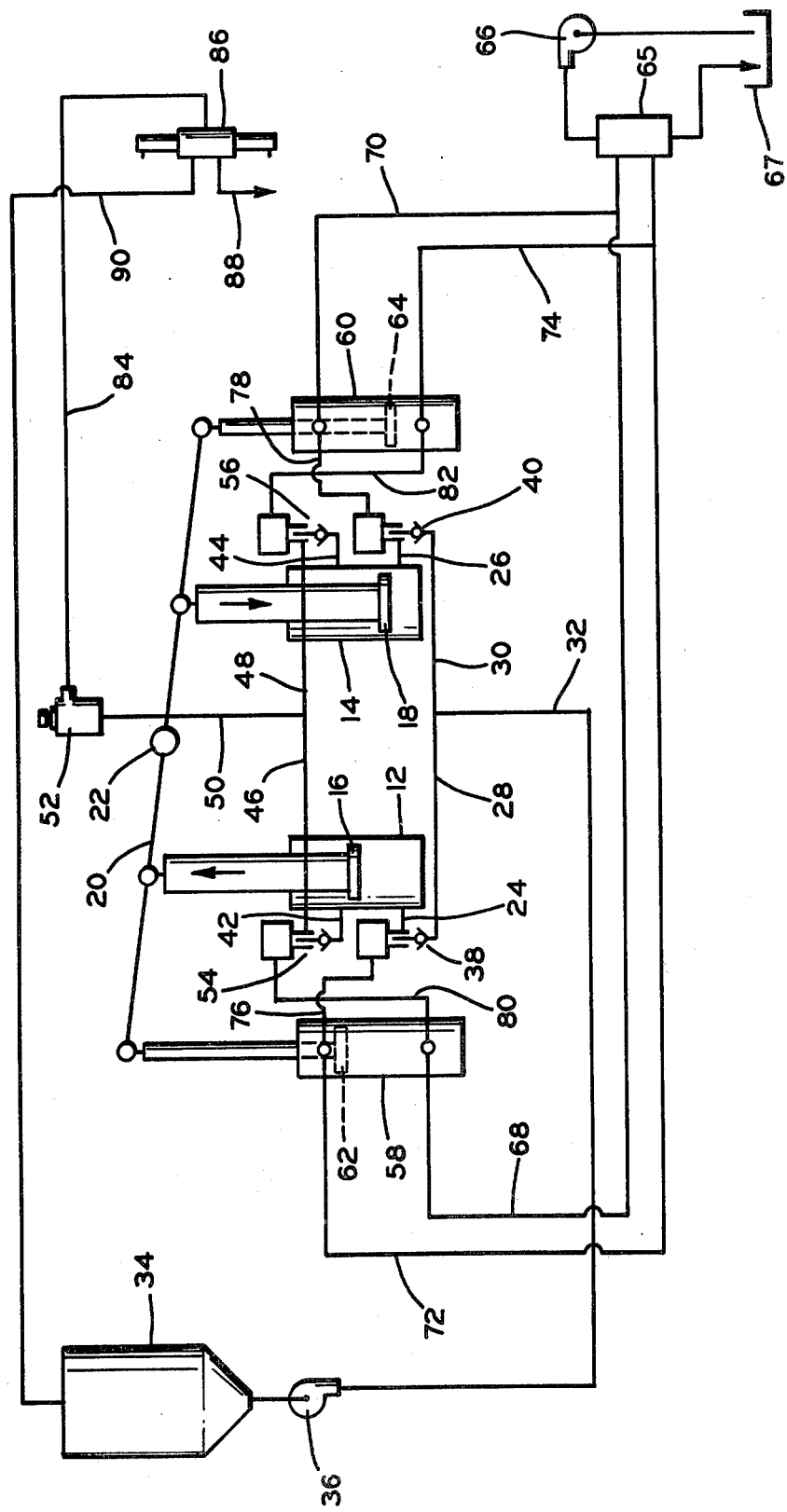
FIG. 1 is a diagrammatic view of apparatus for metering and moving a quantity of metered material from one location to another and employing valves according to the invention.

Referring to FIG. 1, a system is shown for metering highly viscous materials and for moving the materials from one location to another. Such viscous materials include resins that are heavily loaded with fillers, fibers, or particulates. The system includes two metering cylinders 12 and 14 in which are reciprocated rams 16 and 18. The rams are preferably reciprocated in the cylinders by a lever or rocker arm 20 which is centrally pivotably supported by a pin 22 at equal distances from the rams.

The cylinders 12 and 14 have inlets 24 and 26 at the blind ends thereof. These inlets are connected by inlet lines 28 and 30 and a common inlet line 32 to a suitable source 34 of the material to be metered and transferred.

The material from the source 34 is supplied under positive pressure, in this instance, by a suitable pump 36. The inlet lines 28 and 30 have power-assisted check valves 38 and 40 therein in accordance with the invention, which valves permit flow only toward the cylinders. These valves will be discussed more fully subsequently.

The cylinders 12 and 14 also have outlets 42 and 44 to which outlet lines 46 and 48 are connected. These outlet lines communicate with a common outlet line 50 having an adjustable back-pressure valve 52 therein. This valve enables the outlet pressure to exceed the inlet pressure. Power-assisted check valves 54 and 56 are located in the outlet lines 46 and 48 to direct the material only away from the cylinders 12 and 14. These check valves are the same design as the check valves 38 and 40.

The rocker arm 20 is driven or reciprocated by two fluid-operated drive cylinders 58 and 60 having pistons 62 and 64 therein. Fluid, specifically liquid, under pressure is supplied to the drive cylinders 58 and 60 through a suitable four-way valve 65 from a source 66, such as a pump, with the liquid being returned to a reservoir 67. When the liquid under pressure supplied to the blind end of the cylinder 58 through a line 68, it is also supplied to the rod end of the cylinder 56 through a line 70. Similarly, when fluid is supplied under pressure to the rod end of the cylinder 58 through a line 72, it is also supplied to the blind end of the cylinder 56 through a line 74. The check valve 38 communicates with the rod end of the cylinder 58 through a line 76 and the check valve 40 communicates with the rod end of the cylinder 60 through a line 78. Similarly, the check valve 54 communicates with the blind end of the cylinder 58 through a line 80 and the check valve 56 communicates with the blind end of the cylinder 60 through a line 82.

In the operation of the system of FIG. 1, assuming that the ram 16 is moving upwardly, viscous material will be forced through the inlet line 28 past the check valve 38 from the source 34. At the same time, the ram 18 is moving downwardly to force material out of the cylinder 14 and past the check valve 56. This material will flow through the outlet line 50 and pass through the back pressure valve 52.

During this movement of the rams 16 and 18, liquid under pressure is supplied to the blind end of the cylinder 58 through the line 68 and to the rod of the cylinder 60 through the line 70. The pressure in the blind end of the cylinder 58 tends to close the check valve 54 more fully by the fluid pressure being transmitted thereto through the line 80. The check valve 40 also tends to be closed more fully by the fluid pressure being transmitted thereto from the rod end of the cylinder 60 through the line 78.

Similarly, when the ram 16 is moving down in the cylinder 12 and the ram 18 is moving up in the cylinder 14, fluid under pressure is supplied to the rod end of the cylinder 58 through the line 72 and to the blind end of the cylinder 60 through the line 74. The check valve 38 then tends to be closed more fully by pressure being transmitted from the rod end of the cylinder 58 through the line 76. The check valve 56 also tends to be closed more fully by pressure being transmitted from the blind end of the cylinder 60 through the line 82. This power assist for the check valves provides more precise opening and closing thereof and causes any viscous fillers, particulates, or fibers caught between the valve and the seat to be severed to enable the valve to close.

During the operation of the system, the metered viscous material flowing through the back-pressure valve 52 moves through a line 84 to a three-way valve 86 embodying the invention. The metered material can then be dispensed through a line 88 or recirculated to the source 34 through a line 90.

Figure 2:
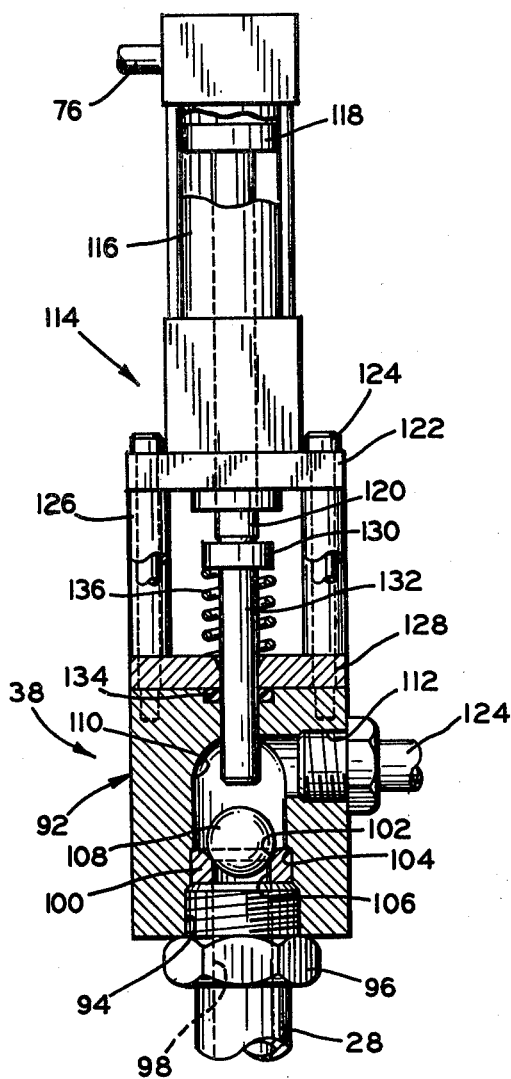
FIG. 2 is a view in elevation, with parts broken away and with parts in cross section, of a power-assisted valve in accordance with the invention.

Referring to FIG. 2, one of the check valves 38, 40, 54, and 56 will be discussed in detail. The valve 38, in this instance, includes a main housing 92. The housing 92 has a lower threaded opening 94 in which is threadedly received a fitting 96 having a central bore 98 which can communicate with the inlet line 28. The fitting 96 holds a valve seat body 100 having a valve seat 102 against a shoulder 104 in the housing, the valve seat body also having a central opening 106 communicating with the fitting bore 98. With this arrangement, the valve seat body 100 can be readily replaced if the valve seat 102 should become worn. A valve body or ball 108 has a diameter larger than the diameter of the valve seat 102 and can readily close the valve. The valve ball 108 is retained in a ball chamber or cage 110 formed by the housing 92 with the chamber 110 having a curved upper end fitting smoothly with an outlet opening 112 which communicates with the line 24, in this instance. The chamber 110 is also not much larger in diameter than the ball 108 to minimize dead areas in the valve in which more viscous materials from the material being metered can be deposited.

The valve ball 104 can be urged toward the valve seat 102 by power-assisted means indicated at 114. In this instance, the means 114 includes a fluid-operated cylinder 116 having a piston 118 therein and a piston rod 120 extending therefrom. Fluid can be supplied to the blind end of the cylinder 116 through the line 76. The cylinder 116 has a mounting flange 122 with elongate threaded fasteners 124 extending through the flange 122, through sleeves 126, and through a mounting plate 128 where they are threaded into the housing 92. This positions the cylinder 116 in the proper spaced relationship with respect to the housing 92. The piston rod 120 engages a head 130 of a connecting rod or pin 132 which extends through the mounting plate 128 and a seal or O-ring 134 in the upper part of the housing 92 and into the chamber 110. The pin 132 is urged upwardly or away from the valve ball 108 by a return spring 136 located between the pin head 130 and the mounting plate 128.

When fluid is supplied to the blind end of the cylinder 116, the piston rod 120 moves the connecting pin 132 into the chamber 110 against the force of the spring 136. The pin 132 can thus force the ball 108 more fully against the valve seat 102 even though pressure in the line 24 tends to act in a manner to close the valve ball 108 anyway. The increased pressure, however, enables any materials caught between the ball and the valve seat to be fully severed and to assure closing of the valve ball. The retracted position of the connecting pin 132 also enables the open position of the valve ball 108 to be determined, with a small movement enabling the valve to change from closed to fully open. The small movement along with the rapid movement of the ball achieved through the power assist enable rapid cycling of the valve and the piston to be achieved, and a minimum bleed back or slip of the material also to result.

With the piston rod 120 and the pin 132 separate from the valve ball 108, the ball is free floating and can be repositioned on the valve seat 102 during each cycle. Any edge residue otherwise tending to be built up on the ball will be cut and removed by the seat and the high closure pressure. The change in the position of the ball also extends the life of the valve seat.

Figure 3:
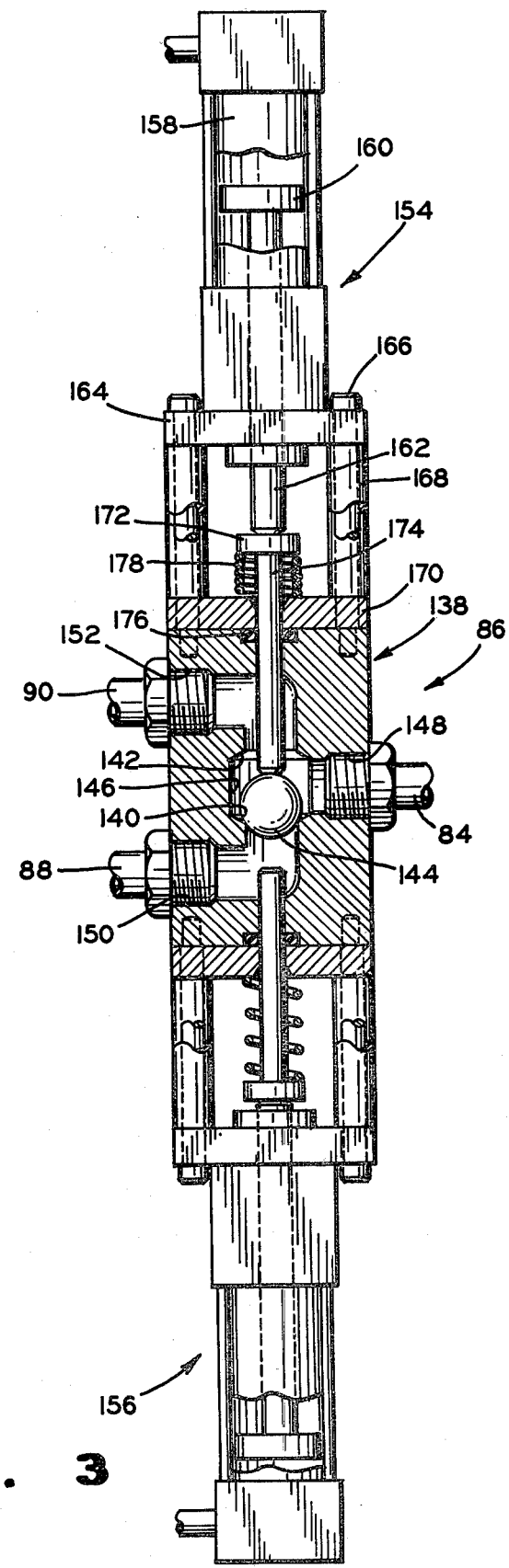
FIG. 3 is a schematic view in elevation, with parts broken away and with parts in cross section, of a modified power-assisted valve.

In FIG. 3, the power-assisted three-way valve 86 is shown. The valve 86 includes a housing 138 forming a first annular valve seat 140 and a second annular valve seat 142. A valve ball 144 is located in a chamber or cage 146 between the two seats 140 and 142. The housing 138 can be constructed in multi-parts to enable insertion of the ball 144. The housing 138 also forms an inlet 148, a first outlet 150, and a second outlet 152 which communicate with the lines 84, 88, and 90, respectively of FIG. 1.

The valve has first power-assisted means 154 for urging the valve ball 144 against the first valve seat 140, and second power-assisted means 156 for urging the valve ball 144 against the second valve seat 142. Each of the power-assisted means 154 and 156 includes a fluid-operated cylinder 158 having a piston 160 therein and a piston rod 162 extending therefrom. The cylinder 158 has a mounting flange 164 with fasteners 166 extending through the flange, through sleeves 168, and through a mounting plate 170 beyond which they are threaded into the housing 138. The piston rod 162 engages a head 172 of a connecting rod or pin 174 which extends through the mounting plate 170, past a seal 176, and into the chamber 146. A return spring 178 is located between the head 172 of the pin 174 and the mounting plate 170.

Fluid under pressure can be supplied alternately to the blind ends of the cylinders 158 of the power-assisted means 154 and 156 to alternately urge the valve ball 144 against the valve seat 140 and against the valve seat 142. By employing the two powered assisted means, piston rods 162 and the conecting pins 174 can be separate from the valve ball 144 so that the ball again is free floating and can change its contacting position with the valve seats 140 and 142. This achieves the same advantages then as result with the free floating ball 108 of the valve 38 of FIG. 2.

While the fluid-operated cylinders for the valves have been described as being single acting, they can also be double acting. Also, second return springs in the cylinders 116, for example, can be employed to further assist in the return strokes of the pistons.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A fluid-assisted ball valve comprising means forming a first valve seat, means forming a second valve seat, means forming a retaining chamber between said valve seats, a valve ball in said retaining chamber, an inlet passage communicating with said retaining chamber, a first outlet passage communicating with said retaining chamber through said first valve seat, a second outlet passage communicating with said retaining chamber through said second valve seat, first fluid-operated means forming a first cylinder, a first piston reciprocable in said first cylinder, first rod means connected to said first piston and extending out of said cylinder toward said valve ball, said first rod means being separate from said valve ball, and line means for supplying fluid under pressure to an end of said first cylinder to cause said first rod means to urge said valve ball toward said first valve seat, second fluid-operated means forming a second cylinder, a second piston reciprocable in said second cylinder, second rod means connected to said second piston and extending out of said second cylinder toward said valve ball, and second line means for supplying fluid under pressure to an end of said second cylinder to cause said second rod means to urge said valve ball toward said second valve seat.

2. A fluid-assisted ball valve according to claim 1 characterized by first spring means for urging said first piston toward the blind end of said first cylinder and second spring means for urging said second piston toward the blind end of said second cylinder.

3. A fluid-assisted ball valve comprising means forming a first valve seat, means forming a second valve seat, means forming a retaining chamber between said valve seats, a valve ball in said retaining chamber, an inlet passage communicating with said retaining chamber, a first outlet passage communicating with said retaining chamber through said first valve seat, a second outlet passage communicating with said retaining chamber through second valve seat, first fluid-operated means forming a first cylinder, a first piston reciprocable in said first cylinder, first rod means connected to said first piston and extending out of said cylinder toward said valve ball, said first rod means being separate from said valve ball, said first rod means including a first piston rod and a first separate rod, with the first separate rod being positioned between said first piston rod and said valve ball and engagable with both, and line means for supplying fluid under pressure to an end of said first cylinder to cause said first rod means to urge said valve ball toward said first valve seat, second fluid-operated means forming a second cylinder, a second piston reciprocable in said second cylinder, second rod means connected to said second piston and extending out of said second cylinder toward said valve ball, said second rod means including a second piston rod and a second separate rod, with the second separate rod being positioned between said second piston rod and said valve ball and engagable with both, and second line means for supplyingfluid under pressure to an end of said second cylinder to cause said second rod means to urge said valve ball toward said second valve seat.

4. A fluid-assisted ball valve according to claim 3 characterized by first spring means for urging said first piston toward the blind end of said first cylinder, and second spring means for urging said second piston toward the blind end of said second cylinder.

* * * * *